United States Patent [19]

Bussell

[11] B 3,919,453

[45] Nov. 11, 1975

[54] CORROSION RESISTANT COATED METAL

[75] Inventor: George W. Bussell, Dearborn, Mich.

[73] Assignee: Inmont Corporation, New York, N.Y.

[22] Filed: Mar. 20, 1973

[21] Appl. No.: 343,136

[44] Published under the Trial Voluntary Protest Program on January 28, 1975 as document no. B 343,136.

Related U.S. Application Data

[62] Division of Ser. No. 179,168, Sept. 9, 1971, abandoned.

[52] U.S. Cl. ............... 428/336; 106/14; 106/267; 204/181; 252/396; 260/22 EP; 427/388; 428/458
[51] Int. Cl.$^2$ ............... B32B 15/08; C09D 5/08; C23B 13/00
[58] Field of Search........... 106/14, 267; 117/132 R, 117/134, 167, 132 B; 204/181; 252/396; 260/22 EP; 427/388; 428/336, 458

[56] References Cited
UNITED STATES PATENTS

| | | | |
|---|---|---|---|
| 3,340,213 | 9/1967 | McGary et al. | 260/22 EP |
| 3,341,484 | 9/1967 | Hoy | 260/18 |
| 3,341,485 | 9/1967 | Long | 260/18 |
| 3,493,483 | 2/1970 | Gacesa | 204/181 |
| 3,692,717 | 9/1972 | Blank et al. | 260/21 |
| 3,730,865 | 5/1973 | Kapalko et al. | 204/181 |

Primary Examiner—Charles E. Van Horn
Assistant Examiner—Robert A. Dawson

[57] ABSTRACT

Synthetic unsaturated fatty acid oils are prepared by esterifying ethylenically unsaturated fatty acids with 9-oxatetracyclo-4.4.1$^{2,5}$0$^{1,6}$0$^{8,10}$ undecan-4-ol. The unsaturated oil is reacted with maleic anhydride to obtain a maleinized product that is soluble in aqueous alkaline solutions. Aqueous alkaline solutions of the maleinized oil are used in primer compositions that are applied by electroposition to metal surfaces to obtain primed surfaces having improved corrosion resistance.

5 Claims, No Drawings

CORROSION RESISTANT COATED METAL

This application is a division of Ser. No. 179168 filed Sept. 9, 1971, now abandoned.

The present invention relates to electroposition of organic resinous coatings. More particularly the invention relates to improvements in resins for use in electrodeposition coating processes, processes for making electrodeposition coating composition, methods of electrodeposition and improved coatings produced by electrodeposition.

The electrodeposition of resinous coatings is well known. The resinous materials employed generally contain carboxylic acid groups which make the resin soluble or reducible in aqueous alkali, aqueous ammonia, or aqueous amine solutions. The resin is electrodeposited on the object to be coated by immersing the object, which must be electrically conductive, in the aqueous solution of the resin and passing unidirectional electric current through the solution using the object to be coated as the anode. The electrodeposited coating is then dried and cured by heating.

Although electrodeposited coatings as taught in the prior art have many advantages, it has been difficult to obtain good corrosion resistance, especially in thin films, and especially when maleinized triglyceride drying oils are used. The resins of the present invention, although relatively inexpensive, have the unexpected property of being electrodepositable in very thin uniform films having unexpectedly good salt spray, or corrosion resistance.

The novel resins of present invention are soluble in aqueous solutions of inorganic bases, e.g. potassium hydroxide, or in aqueous ammonia or amines. When amines are used the lower alkyl amines, or hydroxyl alkyl amines, are preferred, such as methyl amine, propyl amine, ethyl amine, dimethyl amine, triethyl amine, dipropyl amine, ethanolamine, diethanolamine, etc.

The aqueous solutions of the novel resins are useful for electrodepositing clear films of the resins or, when pigmented, they are useful for electrodepositing pigmented films. Pigments useful in the composition include any conventional type pigment, such as, lead chromate, strontium chromate, lead oxide, iron oxide, titanium dioxide, carbon black phthaocyanine blue, phthalocyanine green, toluidine red, quinacridones, or combinations of two or more of such conventional pigments may be used.

Other conventional additives may be included in the aqueous coating compositions when desired. Usually it will be desirable to include a dispersing agent if a pigment is used. Other conventional additives, such as bactericides and anti-oxidants may be included when desired.

In accordance with the invention an ethylenically unsaturated oil containing alicyclic rings is reacted with maleic anhydride in the proportions of from 15 to 20 percent maleic anhydride to 85 to 80 percent of the oil. This maleinization reaction is carried out at elevated temperatures in accordance with prior teachings for the reaction of maleic anhydride with ethylenically unsaturated fatty acid glyceride oils, (e.g., see U.S. Pat. No. 2,188,882). The reaction is continued until at least substantially all of the maleic anhydride has reacted as indicated by a negative color test for free maleic anhydride with dimethyl aniline. The resulting reaction product, which is a resinous polycarboxylic acid or anhydride, has an acid number of on the order of 50 to 90 (based on non-volatiles) and is soluble in aqueous alkali, aqueous ammonia, or aqueous amine solution.

Advantageously, the maleinization of the ethylenically unsaturated oil containing alicylic rings is carried out in solution in a volatile organic solvent, e.g. xylol. After reaction is complete the solvent may be removed by heating, under partial vacuum if necessary. Also, if desired the maleinized oil may be reduced to lower viscosity by adding solvent. If the maleinized product is to be used in aqueous electrodeposition coating baths, the reducing solvent should be miscible with water.

The ethylenically unsaturated oil containing alicyclic rings is prepared by reacting 9-oxatetracyclo-4.4.1$^{2,5}$0$^{1,6}$0$^{8,10}$ undecan-4-ol, the chemical formula of which is:

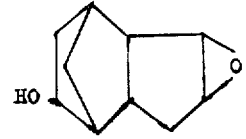

with three molecular equivalents of the desired unsaturated long chain fatty acid to give a tri-ester of the formula

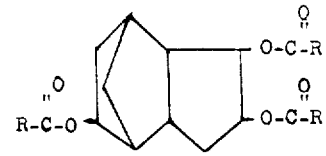

where R represents the long chain hydrocarbon radical of the long chain fatty acid. The esterification is carried out in conventional manner by heating, preferably in the presence of an esterification catalyst.

The following examples in which the parts are by weight are given to illustrate the invention.

EXAMPLE I 194 parts of 9-oxatetracyclo-4.4.1$^{2,5}$0$^{1,6}$0$^{8,10}$ undecan-4-ol, 806 parts of linseed fatty acid (acid value 197–204), 0.5 parts of dibutyl tin oxide (catalyst) and 30 parts of xylol were heated to reflux (about 450°F.) and water of reaction was removed as formed. Heating was continued until reaction was complete as indicated by the decrease in water formation and lowering of the acid number to 3 or less, based on onnvolatiles. The resulting product had a viscosity of D-E (Gardner Bubble Viscometer, at 25°C.).

85 parts of the esterification product, cooled to 300°F or less were reacted with 15 parts of maleic anhydride by heating with appropriate stirring, to 205°C. or until an exothermic reaction was observed. After the exotherm subsided, the temperature was raised slowly to 230°–240°C and maintained there until maleinization was complete. The maleinization reaction was determined to be complete by a negative color test for free maleic anhydride with dimethyl aniline. Heating was continued until a viscosity of U-V at 60 percent non-volatile in 4-methoxy-4-methyl-2-pentanone was reached. Heating was then discontinued and any volatile materials, such a xylol, were removed; a partial vacuum may be applied, if desired, to facilitate removal of volatile materials. After cooling the maleinized oil product to 160°C. in an inert atmosphere, e.g., carbon dioxide or nitrogen, it was reduced to desired viscosity with solvent, preferably a water miscible solvent if it is to be used in aqueous electrodeposition coatings.

The maleinized synthetic oil containing alicyclic rings as prepared above is especially useful for application by electrodeposition to metallic surfaces and the metallic surfaces coated with heat cured thin films of material have very good corrosion resistance, or salt spray resistance. This good corrosion resistance is surprising and unexpected in view of the fact that maleinized vegetable oil glyceride esters yield films or coatings having poor corrosion resistance under similar conditions.

In accordance with a preferred embodiment of the invention, the polycarboxylic maleinized product of the invention, such as that prepared in Example I above, is used as an electrodeposited primer in the finishing of automobile bodies. The conventional process of painting, or finishing, automobile bodies in the automotive industry involves a number of steps. The steel sheet, or panel, of which the automobile body is formed is first conditioned by subjecting it to cleaning and phosphating treatment. A primer coat is then applied to the phosphatized surface to provide better corrosion resistance, a smoother surface, and better adhesion of subsequently applied finish coats. After sanding the primer coating, one or more finish coats are applied.

One desirable method for applying primers to automobile bodies is by electrodeposition and a preferred use for the novel resins of the present invention is as a film former in an aqueous solution to be applied as a primer by electrodeposition. A suitable electrodeposition primer composition, using the maleinized synthetic oil Example I would contain, for example, 9 parts of maleinized product dissolved in 100 parts of aqueous triethyl amine solution at a pH of 8 to 8.5. The solution would contain other conventional additives as desired, for example pigment and anti-oxidant. A phosphatized steel panel was coated by electroposition by immersing it in the solution and passing direct current at a potential of 175 volts through the solution using the phosphatized steel panel as the anode until a film thickness of 0.4–0.5 mil (cured) had been applied. The coated panel, when the coating had been cured at 385°F for 15 minutes, had a smooth appearance and excellent salt spray resistance and corrosion resistance and in this respect was better than a similar panel coated with maleinized linseed oil.

EXAMPLE 2

A polymer produced as in Example I and with the same composition except the maleic anhydride content was 17.5 percent was dissolved in a solvent mixture consisting of 56 percent methyl ethyl ketone and 44 percent 4-methoxy4-methyl-pentanone-2 to give a resin solution of about 80 percent non-volatile content. 600 parts by weight of this resin solution (containing about 480 parts non-volatile) were then mixed with 10 parts of quaiacol (anti-oxidant), 67 parts triethyl amine and 54 parts of distilled water to give a clear, viscous solution. This solution was then further diluted with 820 parts of distilled water to give an aqueous vehicle having a non-volatile content of 31 percent and a pH of 8.1

A coating composition was prepared by mixing 80 parts of the aqueous vehicle with 41 parts of carbon black pigment, 7 parts of strontium chromate pigment and 15 parts of distilled water in a one quart capacity steel shot mill containing one kilogram of ⅛ inch diameter steel shot. The steel shot mill and its contents were shaken on a typical "Red Devil" paint shaker for one hour. An additional 320 parts of the aqueous vehicle were then added to the mill and shaking was continued for one-half hour. The resultant dispersion had a Hegeman grind gauge reading of about 7, non-volatile content of about 37 percent and a pigment to binder ratio of about 39 to 100.

18 parts of the 37 percent non-volatile content dispersion and 190 parts of the 31 percent non-volatile content aqueous vehicle were weighed into a wide mouth quart glass jar and further reduced with 592 parts of distilled water. The resulting aqueous primer had a non-volatile content of about 8.2 percent and a pigment to binder ratio of about 2.9 to 100.

Two 3-inch × 9-inch zinc phosphated steel panels, 1½-inch apart and facing each other, were immersed in the aqueous primer to a depth of 6½-inch. A potential of 175 volts was applied between the two panels for 60 seconds. The anode panel was removed from the bath and washed with tap water to remove undeposited material. The deposited film was then baked 14 minutes at 385°F.

The baked coating, 0.5 mil thick, showed good corrosion resistance when subjected to salt spray (fog) testing as outlined by ASTM Method B117-64 for 336 hours. A similar coating prepared from a maleinized linseed oil had poor corrosion resistance when subjected to the same test.

Similar results were obtained when the synthetic unsaturated oil of Example I was reacted with maleic anhydride in the ratio of 20 parts maleic anhyride to 80 parts oil. However, when ratios of less than 15:85 or more than 20:80, of maleic anhydride to oil are used, the resulting product was inferior when used in an electrodeposition primer.

Similarly, the substitution of other unsaturated acids, viz. fumaric acid, itaconic acid and methacrylic acid, for maleic anhydride resulted in inferior primers.

What is claimed is:

1. An article of manufacture consisting of a metal object having a corrosion resistant 0.4 to 0.5 mil thick coating of heat cured resin consisting essentially of the heat reaction product of a mixture consisting of 15 to 20 percent maleic anhydride and 85 to 80 percent of a synthetic oil containing alicyclic rings consisting of the esterification product of one mole 9oxatetracyclo-4.4.1 $^{2,5}0^{1,6}0^{8,10}$ undecan-4-ol with three moles of unsaturated long chain fatty acid.

2. An article of manufacture as in claim 1 wherein the unsaturated long chain fatty acid is linseed fatty acid.

3. An article of manufacture as in claim 1 wherein the unsaturated long chain fatty acid is soya fatty acid.

4. An article of manufacture as in claim 1 wherein the unsaturated long chain fatty acid is sunflower fatty acid.

5. An article of manufacture as in claim 1 wherein the unsaturated long chain fatty acid is tall oil fatty acid.

* * * * *